July 28, 1970  C. A. LEE  3,522,138
VENEERED PRODUCT AND A CROSSBANDING MATERIAL THEREFOR
Filed Aug. 23, 1967
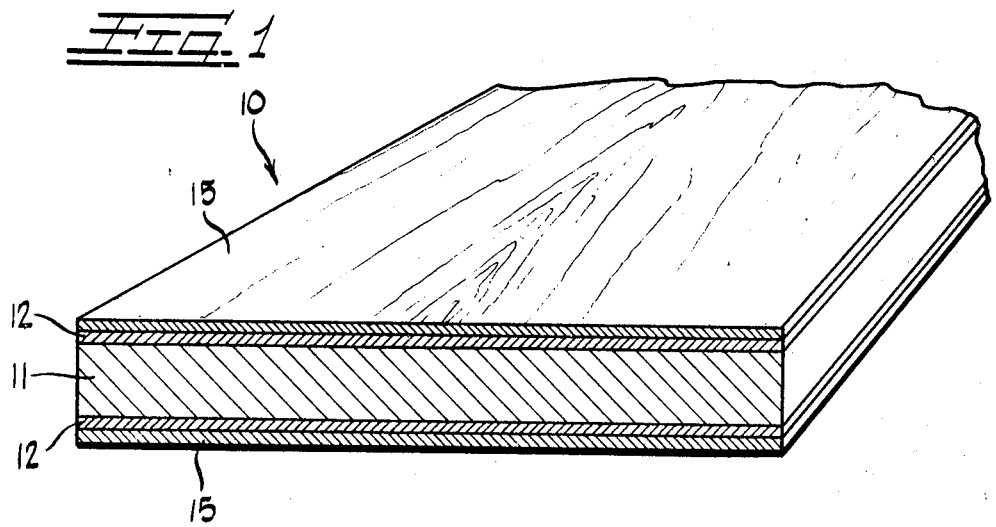
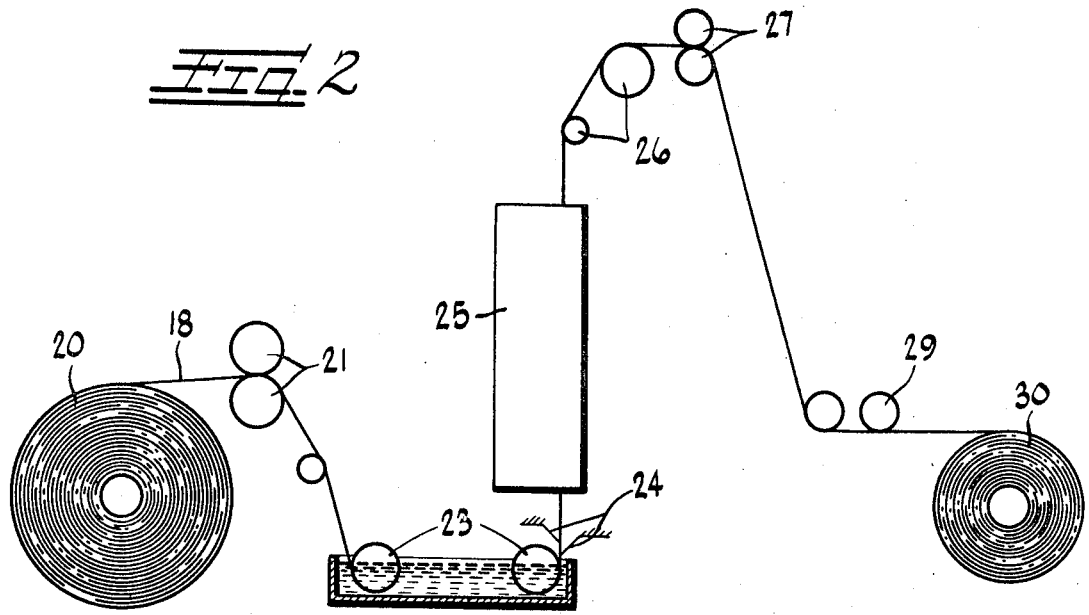
INVENTOR
CHARLES ALLEN LEE
BY Anderson, Luedeka, Fitch, Even, & Tabin
ATTORNEYS

United States Patent Office 3,522,138
Patented July 28, 1970

3,522,138
VENEERED PRODUCT AND A CROSSBANDING MATERIAL THEREFOR
Charles Allen Lee, Knoxville, Tenn., assignor, by mesne assignments, to Southeastern Products, Inc., Knoxville, Tenn., a corporation of Tennessee
Filed Aug. 23, 1967, Ser. No. 662,759
Int. Cl. B32b 5/12
U.S. Cl. 161—92                               13 Claims

ABSTRACT OF THE DISCLOSURE

A veneered product uses crossbanding material as a subveneer. The crossbanding material is formed of long, intertwined filaments which are randomly disposed and are heat and moisture stable. The filaments form a sheet which is loaded with a thermo-setting resin which is cured, in situ. The surfaces of the crossbanding material have void openings therein which serve as receptors for the veneering adhesive and permit lateral spreading of the adhesive during the veneering operation.

---

This invention relates to veneered products having crossbands, which are subveneers disposed beneath outer facing veneers; and also to an improved crossbanding material.

Veneered products containing crossbands are usually made of an uneven number of layers, e.g., three, five or more layers, one of which is a central layer termed a core. At least one crossband is disposed on a side of the core, and an outer facing veneer is adhered to the outer side of the crossband. The core may be a thick piece of wood or pieces glued together, particle board (pressed or extruded, plain or banded); or on the other hand, the core itself may be a relatively thin layer. When a crossband and a veneer are disposed on both sides of the core, the respective layers on opposite sides of the core usually have nearly equal sizes, weights and strength so that with expansion or shrinkage, due to a change in moisture content of the veneers and crossbands, stresses on one side of the product are balanced by equal and opposite stresses on the opposite side of the core. Ideally, the stresses should be balanced as to both direction and magnitude to prevent warping.

Crossbands have been formed from a number of different materials such as thin strips of wood, resin impregnated papers, thin chipboard sheets, and cellulosic fibrous sheets. Most of these prior art crossbanding materials have a definitely greater strength in the direction of the grain than in the cross-grain direction, or in the case of paper-based products, they have greater strength in the machine direction than in the cross-machine direction. It is known that expansion and shrinkage of wood fibers is many times greater in the cross-grain (or cross-machine) direction than in the grain (or machine) direction. To provide cross-grain strength to the veneers, the crossbanding materials are laid with their grains or machine directions at right angles to the grain of the wood facing veneers and to the grain of the core stock. Thus, the crossbands are oriented to resist expansion or shrinkage of the veneer fibers in the cross-grain direction. The fibers of respective layers are attempted to be adequately bonded together so that they are not free to move relative to one another with stresses due to changes in their moisture contents, lest cracks develop in the surface of the face veneers. Such cracking is commonly called checking.

Grained crossbands and other highly oriented directional strength materials must be aligned on opposite sides of the core with their respective grains running parallel. If care is not taken to align the grains, the direction of the stresses are not offsetting and these non-offsetting stresses often cause warping.

Crossbands made from paper or chipboard are in many instances formed with fibers arranged in definitive layers which tend to delaminate from each other when subjected to shear stresses from the core on one side and a facing veneer on the other side.

Heretofore, most crossbanding materials such as resin impregnated paper, chipboard and other cellulosic fibrous materials have been used in the attempt to provide a smooth, i.e., non-textured, outer surface to prevent this texture from showing through the thin facing veneer, a phenomenon known as telegraphing. While considerable efforts have been devoted to obtain an even coating of the entire surface of these smooth crossbanding materials, pools of glue may form and cause blisters or blowouts in the facing veneer. Sometimes the glue coating may be spotty, causing areas of uneven adhesion or even areas without any adhesion. If adhesion between fibers is inadequate, some fibers in the facing veneers may separate in the cross-grain direction thereby checking the facing veneers.

Crossbanding materials of the prior art have, in some instances been insufficiently porous in that they were not sufficiently receptive to a glue, adhesive, or resin. Thus, during fabrication, the glue retention was spotty, and there appeared areas of uneven adhesion. On the other hand, some of the prior art crossbanding materials have been so porous as to leave voids which were not properly adhered to the veneer or to the core material. Many of the chipboard or impregnated papers are relatively stiff and brittle, and they chip and delaminate when they are bent, thereby limiting their use for molding about curbed surfaces. Moreover, these crossbanding materials are not as readily machinable as they tend to split or crack when cut with ordinary woodworking tools.

It is most desirable that the crossbanding material be able to compete from a cost standpoint with presently available materials, not only in its initial purchase price but also in its ease of handling during fabrication. Also, crossbanding should be usable with existing facilities and processes employed for fabricating the veneered product, and should have particularly the ability to be adhered with presently used low cost glues and to withstand the pressures and temperatures now used in fabricating. Thus, initial capital expenditures may be minimized and result in an economically practical as well as a workable crossbanding material.

Accordingly, an object of the invention is to provide, as contrasted with the prior art, a veneered product having an improved glue bond between layers, yet which is commercially acceptable from a cost standpoint.

A further object of the invention is to provide crossbanding material having surface and void volume characteristics providing improved glue reception and adhesion for the plies of the veneered product.

A specific object of the invention is a crossbanding product which has, as contrasted with wood and paper based crossbanding products, good bidimensional strength and is relatively resistant to heat and absorbs relatively little moisture.

Other objects and advantages will become apparent from the following detailed description taken in connection with the accompanying drawings in which:

FIG. 1 is a cross-sectional view of a veneered product embodying the present invention; and FIG. 2 is a diagrammatic illustration of an apparatus for making the crossbanding material.

As shown in the drawings for purposes of illustration, the invention is embodied in a veneered product in the form of a flat panel 10 having an odd number of plies, five in this instance, adhered to one another. The panel includes a central core 11 which, in this instance, is a thick piece of inexpensive wood or particle board, to which are adhered the interior faces of a pair of opposite crossbands 12 which are of substantially identical construction and strength, as will be explained in detail hereinafter. A pair of facing veneers 15 are adhered to the outer sides of the crossbands to form the completed panel. Either one or both of the facing veneers are made of a decorative, expensive veneer. Where only one side of the panel 10 is exposed, as in fine furniture, only the exposed veneer is made of the expensive wood and the opposite veneer is made from inexpensive wood having a similar thickness. The grains of the respective veneers are disposed as nearly parallel to each other as possible and, in this embodiment of the invention, are disposed at right angles to the grain of the core 11.

With prior art veneered products considerable difficulty is encountered in balancing the respective crossbanding layers in both strengths and alignments. For example, wood crossbands may not have their grains precisely aligned parallel to each other; and the respective graining in the crossbands may be of different kinds thereby providing different densities for the opposite crossbanding materials. Also, as will be explained in greater detail, paper-based crossbands of the prior art have fibers stratified, and these strata tend to delaminate under shear stresses. Some hard, smooth crossbands do not readily accept glue, nor do they allow glue migration to deplete any pools of glue or to cover any uncoated areas. Other very porous crossbanding materials, such as some various porous woods, are too porous, and the glue coating does not fill all of the voids in the crossband, thereby resulting in spotty adhesion between the crossbands and the opposing veneers or core.

In accordance with the present invention, extremely good adhesion is obtained between the veneer and the core by the crossband and improved resistance against delaminating is obtained with a crossband formed of a fibrous mat loaded with a cured thermo-setting resin. To achieve improved adhesion, the crossbanding material is provided with a predetermined and controlled amount of void openings in its outer surfaces to accept glue, and its outer surfaces are relatively rough to cause the glue to migrate laterally during the veneering operation. As will be explained in greater detail hereinafter, in the preferred crossband some of the void openings in the opposite faces of the crossband are interconnected and, thus, allow the glue to penetrate through the material, whereby upon curing, the glue becomes mechanically interlocked with the crossbanding material. The preferred crossband has long filaments which are stable to heat and moisture, so that the crossband itself is relatively resistant to contraction and expansion with changes in ambient temperature and humidity. To avoid delamination between layers of fibers as in paper-based products, the crossband filaments are long, e.g., staple length, and are, in the preferred example, continuous in length so that they may be intertwined in tortuous three dimensional paths to cross other filaments at varying angles and in different directions.

While the prior art suggests that a surface roughness for the crossbanding material is to be avoided to prevent the rough surface from showing through the veneer, it has been found that a certain amount of roughness is most desirable as a receptor for the glue and for causing the glue to migrate. The rough surface, which has a textured appearance in the preferred embodiment of the invention, affords a larger surface area than would a smooth surface and permits the distribution of the glue during the pressing portion of the fabrication process. Although the surface is rough to touch, the crossband is uniformly flat and of a generally uniform cross-sectional thickness and density, i.e., weight per unit area. Wood crossbanding materials, on the other hand, may have knots or different graining patterns in the respective crossbands that provide different densities for the same thickness of crossbands whereby the crossbands may be unbalanced.

Proceeding now with a more detailed description, the fibrous sheet of the crossband is, in the preferred form of the invention, composed of randomly disposed, continuous filaments bonded together to form a relatively flat web 18, such as non-woven polyester web known as spunbonded and sold under the trademark "Reemay" by E. I. du Pont de Nemours and Company, Wilmington, Del. The present invention is not limited to a spunbonded polyester sheet as the sheet may also be formed from other long, randomly oriented synthetic fibers or continuous filaments such as rayon, polyethylene or glass. Long filaments provide increased strength and can be formed into webs or mats with the filaments intertwined three dimensionally with other filaments. A number of techniques may be employed to form the non-woven sheet such as air forming, water forming or mechanical spreading to obtain good cross-machine strength, uniform density and permeability with rough outer surfaces for the web.

Prior to being filled with the thermo-setting resin, the web 18 is very porous and has a large number of relatively uniformly sized and spaced openings. Thus, the void volume is relatively large prior to reception of the resin. Such openings facilitate a relatively uniform distribution of the resin throughout the body of the web. Upon application of the resin, the fibers become coated with the resin but the outer fibers of the web protrude from the body of resin and form pockets or troughs, resulting in rough outer surfaces. At the same time, within the interior of the web, most of the interstices between fibers become filled with resin, thereby reducing the void volume available to receive the veneering adhesive. As will be seen from the given examples, the sheet becomes loaded with resin by being dipped into a liquid resin bath with the result that the filaments are coated and the amount of voids between the fibers is substantially reduced. The surfaces of crossband, however, are not glazed, i.e., smooth, surfaces. Indeed, the surfaces appear pocked with depressions, i.e., void openings, and the thicker crossbands have a surface which could be described as textured.

The fibers have been found to be relatively heat and moisture stable, as contrasted with fibers of cellulosic materials heretofore employed for the crossbands. That is, the fibers do not absorb moisture in the manner of cellulosic fibers and are not adversely affected by the heat experienced during a laminating operation. Also of considerable importance to the invention are the characteristics of toughness and integrity which enable the crossband layer 11 to be flexed and molded about curved surfaces without chipping or delaminating, as contrasted with the more brittle paper-base materials heretofore employed as crossbanding materials. The crossbanding material has good strength in both the machine and crossmachine direction as the fibers are long and disposed in a substantially random manner thereby providing a relatively good bidirectional strength as contrasted with particularly greater strength in the grain or machine directions of wood or paper-based crossbanding materials. The fibers of the web 18 are not segregated into layers as in prior art paper-based products, and hence, the web does not delaminate under shear stresses. Because of its good strength in each of these three directions, the web is said to have good omnidirectional strength.

The web may be loaded with various plastic materials such as, for example, an epoxy resin, urea formaldehyde, a polyester resin or an acrylic resin. It is preferred that the web be loaded with a plastic material such as thermosetting resin which cures easily, particularly when heated, as will be seen in the following examples.

The webs 18 may comprise polyester fibers having prior to loading with resin, a weight somewhere in the range of 1.3 to 6 ounces per square yard and have a thickness between 11 and 32 millimeters. To afford good tensile strength, the webs may have an average tensile strength about 25 pounds per inch in the machine and cross-machine directions, and webs having a tensile strength of 51 pounds per inch have proven suitable. These webs prior to impregnation are very open and porous and may have Frazier air permeabilities between 120 and 780 c.f.m./ft.$^2$ at ½ inch H$_2$O differential.

Prior to loading with resin, the web 18 is not very stiff and is subject to wrinkling, but after the loading and curing of the plastic material, the crossband is stiffer and resists being wrinkled when laid on the core 11. For example, the stiffness of the untreated web 18 may range from 47 to 844 milligrams and after treating, the stiffness of the crossband may be as high as 4,987 milligrams. For comparison, a brass shim stock 0.002 inch thick has a stiffness of 488 milligrams. Such increased stiffness facilitates handling of the web during fabrication with core and veneer. While becoming relatively stiff, the treated web still retains sufficient flexibility and elasticity to be molded about curved surfaces.

Another important aspect of the crossbanding layer 11 is its relative incompressibility after impregnation so as to withstand the large pressures encountered during fabrication of veneered products. The treated crossband fibers are preferably harder than the wood veneers so that the outer rough surfaces of the treated web embed in the veneering wood. Such embedding aids in the bonding.

The following examples are given for illustrative purposes with the understanding that the present invention is not to be limited to these examples. In the examples, percentages are given on a weight basis.

EXAMPLE 1

A spunbonded polyester web 18 of three denier filaments weighing 6 oz./yd.$^2$ was stripped from a supply roll 20 by feed rolls 21 and fed at a speed of about five ft./min. in a continuous manner into and through an epoxy mixture in a trough 22. The web was fed beneath rolls 23 in the trough and the epoxy mixture filled most of the voids in the web. The treated web was then fed upwardly past doctor blades 24 which scrape excess epoxy mixture from the web surfaces and then through an oven 25 maintained at a constant temperature of about 380° F. The oven had sufficient length to cure the epoxy mixture as the web continued to travel at 5 ft./min. From the oven, the web of the formed crossband was directed about idler rolls 26 and through the nip of feed rolls 27 which fed the web to a slitting and cutting station at which the web was slit longitudinally by a rotating cutter disk 29. In the preferred operation, the web was about 50 inches in width and was slit medially to form two webs each 25 inches wide. These webs were wound onto supply rolls 30, as the material was still flexible even with the cured epoxy therein.

The formulation of the epoxy material used to treat the web was as follows:

| Ingredients: | Percent |
|---|---|
| Epoxy resin adhesive, Type B | 3.0 |
| Epoxy resin adhesive, Type A | 6.1 |
| Acetone | 90.9 |
| | 100.0 |

The mixture was prepared by mixing together epoxy resins sold under the trademarks "Resiweld Type A" and "Resiweld Type B" by the H. B. Fuller Company, St. Paul, Minn., for approximately fifteen minutes, after which the acetone was added and mixed for another fifteen minutes.

Prior to treating, the web 18 was very porous and had a Frazier air permeability of 112 c.f.m./ft.$^2$ after treatment, the permeability was reduced to 9.4 c.f.m./ft.$^2$ leaving the crossband with sufficient void openings to serve as glue receptors. The void openings were interconnected, permitting the veneering glue to flow through. The crossband had a density of 12.9 oz./yd.$^2$ indicating a weght gain of 6.9 oz./yd.$^2$ of epoxy. The outer surfaces of the crossband remained rough, i.e., unglazed. The hills and valleys making the rough surface were formed by the filaments of the web so that the depth of the surface depressions was about the diameter of a filament. The crossband is considerably stiffer so as to resist wrinkling and to facilitate its laying flat on a core layer, and in this example, the stiffness increased from 844 to 5,690 milligrams.

EXAMPLE 2

In a further example, a web 18 of three denier polyester filaments had a basis weight of 1.5 ozs./yd.$^2$ and a thickness of about 10 mils. The web was treated with the same epoxy material described above in the trough 22 and was dipped, doctored and cured while continuously moving at 5 ft./min. After curing by heat at 380° F. in the oven 25, the crossband had a basis weight of 4.3 ozs./yd.$^2$ indicating a weight gain of about 2.8 ozs./yd.$^2$ of epoxy mixture. Prior to receiving the epoxy material, the web had a Frazier air permeability of 472 c.f.m./ft.$^2$ and this was reduced by the treatment to an air permeability of 34.3 c.f.m./ft.$^2$ for the crossband. The surface was still rough to the touch, the sheet was flexible, yet stiffer. Its stiffness had increased from 47 milligrams for the untreated web to 244 milligrams for the finished crossband.

EXAMPLE 3

A web 18 of three denier filaments had a basis weight of ⅛ oz./yd.$^2$ and a thickness of about 13 mils. was run through the trough 22 at a linear velocity of about 5 ft./min. and through the same sort of epoxy mixture as above described. After curing the epoxy in the oven at a temperature of 380° F., the Frazier air permeability was reduced from about 578 c.f.m./ft.$^2$ to about 29.4 c.f.m./ft.$^2$ for the crossband. Thus, the crossband was still slightly permeable. The surface of the crossband remained rough to the touch. The crossband had a basis weight of about 5.5 ozs./yd.$^2$ indicating a weight gain of about 3.6 ozs./yd.$^2$. The stiffness increased from about 44.4 milligrams for the untreated web to about 310 milligrams for the treated web.

From a number of tests it has been determined that the usual accretion of thermo-setting resin is kept within about 2.5 to 7 ozs./yd. This same process has been employed with other thermo-setting resins such as urea formaldehyde and a non-ionic, self-cross linking acrylic emulsion sold under the trademark "Rhoplex" available from Rohm and Haas Co., Philadelphia, Pa. The amount of resin accretion for these later materials was about 3 to 6 ozs./yd. after dipping in the trough 22. The oven temperatures were adjusted to slightly different values appropriate for curing these other thermo-setting plastics. Because the preferred web is substantially white in color and the thermo-setting plastics are usually clear or light colored, it is preferred to add some brown pigment to the material in the tank so that the web has a brown color after treating to match the wood colors. For lighter colored woods, less pigment is used. Satisfactory results are obtained by adding brown pigment to the epoxy material with the pigment being about 5% of the total weight of the epoxy material as applied to the web.

Best results have been obtained with crossbands which have a controlled and limited amount of porosity and having air permeabilities of the order of about 1 to 20 c.f.m./ft.$^2$ at ½ inch H$_2$O pressure. Such crossbands possess sufficient void openings to act as a receptor for glue but become relatively impermeable to moisture when glued between a veneer and central core. Less satisfactory but acceptable results are obtained with crossbands having air permeabilities of 20 to 40 c.f.m./ft.$^2$ at ½ inch H$_2$O pressure. Air permeabilities above 40 c.f.m./ft.² at ½ inch H₂O pressure have not proven as satisfactory in the kinds of veneering tested. It is thought that crossbands which are more permeable than these indicated ranges have too large a void volume for use with conventional gluing techniques with the consequence that the glue does not spread and does not adequately fill the void openings, as contrasted with the preferred crossband materials.

A process of making a veneered wood product employing the crossbanding material will now be briefly described. A sheet of inexpensive veneer 11, such as a sheet of pine having a thickness of ⅟₃₂ of an inch, is placed on a platen of a press. A crossband 11 which has been coated on both sides with a 2 mil thick film of a conventional glue is placed on the inexpensive veneer. The crossband is relatively stiff and does not wrinkle so that it is easily laid on the inexpensive veneer. As is most desirable, the crossband 11 is relatively thin and has a uniform cross sectional thickness and opposite parallel faces or sides. The core is made of an inexpensive wood such as gum which is about ⅝ inch thick. The latter is placed on the upper, coated face of the lower crossband 11 and then an upper, crossband 11, which is also coated on both sides with about 2 mils of glue, is placed on the upper face of the core. Next, a ⅟₁₆ inch thick sheet of an expensive veneer 10, such as walnut, is placed on the upper face of the upper crossbanding layer. An upper press ram is brought into contact with the top surface of the expensive veneer and a pressure of about 200 p.s.i. is applied by the ram to the product. The assemblage is heated to 250° F. for a period of eight minutes after which the veneered product is removed from the press. If the glue is applied in a slightly uneven manner, the pressure forces the glue to spread and the rough surface of the crossbanding material permits the glue to migrate and distribute across the rough surface. The pressure also forces the glue to move into the void openings in the surfaces of the crossbanding material and fill these openings so that the crossbanding layers become substantially impervious to air and moisture.

The surface roughness of crossbanding material does not telegraph through so as to be visible.

One test of the resistance of a veneered product to humidity and temperature changes is to take a veneered product having crossbands formed with 6 oz. webs and soak it in water and then subject the soaked product to a temperature of first −10° F. and then +180° F. When the veneered product utilizing the crossbanding of the present invention was subjected to this test, it did not warp, delaminate or check. Products employing conventional crossbanding materials and made by an identical process, warped or delaminate when subjected to an identical test. The improved results are attributed to the improved crossbanding materials 11 of the present invention.

While the preferred crossbands are permeable to air and are described in connection with their air permeabilities, it is to be understood that the crossbands may be impermeable, provided they have the void openings in their surfaces which will act as glue receptors and spreaders. Slightly permeable crossbands are preferred, however, as they permit veneering glue to flow from one surface to the other opposite surface through interconnected openings, thereby resulting in a glue-to-glue bond and a good mechanical interlock with the filaments. It also equalizes the glue on the two sides of the crossbands.

From the foregoing, it will be seen that the excellent strength characteristics of the crossbanding material results in a stronger veneered product and that its physical properties of a rough surface and a controlled void volume result in extremely good adhesion and bonding of the veneer. The crossbanding material has excellent handling characteristics in that it is sufficiently stiff to resist wrinkling yet is sufficiently flexible and tough that it can be molded about curved surfaces without cracking, chipping or delaminating in the manner of prior art materials. The curing of the resin, in situ, bonds the individual filaments together into an integral three dimensional structure. The permeability of the preferred crossband permits the veneering adhesive to flow from one side of the crossband to the other side and thereby balance the adhesive coatings on the respective sides of the crossband. It is readily machinable by ordinary wood working tools, and it is not as readily perceived at the ends of veneered product as are some of the conventional crossbands. The rough surface allows the outermost sides of the relatively hard filaments to become partially embedded in the veneer wood and core wood. The checkered appearance of the cut, light colored filaments and darker resin may make it less visible at end cuts of the veneered product. Finally, the crossbanding material can be produced economically and may be used in current veneering processes in place of presently used crossbanding materials, particularly in the making of fine, high quality wood furniture.

While a preferred embodiment has been shown and described, it will be understood that there is no intent to limit the invention by such disclosure but, rather, it is intended to cover all modifications and alternative constructions falling within the spirit and scope of the invention as defined in the appended claims.

What is claimed is:

1. Crossbanding material for use with veneer adhesive in the manufacture of veneered products comprising a porous mat of heat and moisture stable filaments which are intertwined to form a sheet, the individual filaments of said sheet following tortuous three-dimensional paths and being randomly oriented in relation to other filaments whereby each filament crosses a multiplicity of other filaments at varying angles and in different directions, said sheet being loaded with a thermo-setting resin which is cured in situ to render said mat substantially incompressible during veneering, said resin coating the individual filaments and effectively bonding them together to provide an integral three-dimensional structure with void openings adjacent the surfaces of the sheet to serve as receptors for the veneer adhesive and to permit migration of the veneered adhesive laterally along the surfaces of the sheet whereby adhesive can bond at least to the surface fibers of said sheet over all of said surfaces.

2. A crossbanding material in accordance with claim 1 in which said sheet is flexible and non-brittle.

3. A crossbanding material in accordance with claim 1 in which said certain of said filaments extend between said surfaces of said sheet to prevent delamination of said sheet.

4. A crossbanding material in accordance with claim 1 in which said mat is formed of continuous polyester filaments weighing about 1.5 to 6.0 ounces per square yard, is loaded with resin in the range of about 2.5 to 7.0 ounces per square yard, and has an air permeability after being loaded with said resin within the range of about one to thirty-five c.f.m./ft.² at ½ inch H₂O pressure differential.

5. A crossbanding material in accordance with claim 1 in which the total void volume of said resin loaded sheet is less than the volume of veneering adhesive to be applied thereto whereby said adhesive will migrate along said sheet surfaces.

6. A crossbanding material in accordance with claim 1 in which said filaments are harder than the wood veneer so as to embed partially therein during a veneering operation.

7. A crossbanding material for use between a core and veneer, comprising a sheet formed of heat and moisture stable, fibrous elements, said sheet having a substantially uniform thickness with opposite, outer parallel surfaces for engaging the core and veneer respectively, said sheet being porous with a predetermined void volume, thermosetting resin of a quantity less than said void volume disposed in said sheet and cured in situ, making said sheet substantially incompressible at pressures exerted thereon during a veneering operation, said sheet having void openings in its surfaces to act as receptors for a veneering adhesive whereby veneering adhesives may penetrate said outer surfaces into the interior of said sheet during a veneering operation, said outer sheet surfaces remaining unglazed so that a veneering adhesive may flow along said outer surfaces and into said depressions.

8. A veneered product comprising an outer veneer, a crossband having a first face adhered to a face of said veneer, a core having a face adhered to a second, opposite face of said crossband, said crossband having randomly disposed filaments defining a sheet of substantially uniform cross-sectional thickness, a body of cured thermo-setting resin disposed between the filaments and coating the filaments within said sheet, a first coating of veneering bonding agent disposed between said faces of said crossbanding layer and the core with projecting portions thereof extending into the body of cured resin at spaced locations, and a second coating of veneering bonding agent disposed between the faces of said crossbanding layer and said veneer with projecting portions extending into the body of cured resin.

9. A veneered product in accordance with claim 8 in which some of the projecting portions of said first and second veneering coatings are joined together to provide a continuous bonding agent bond between said core and said veneer through said crossband.

10. A veneered product in accordance with claim 8 in which said faces of said crossband have fibers partially embedded in the faces of said veneer and said core respectively.

11. A veneered product in accordance with claim 8 in which the volume of bonding agent exceeds the void volume available after the filaments are coated with said thermo-setting resin, and in which the bonding agent penetrates into said veneer and core.

12. A veneered product in accordance with claim 8 in which said bonding agent makes said crossbanding layers substantially impervious to the transfer of moisture through the crossbanding layers to the core.

13. A veneered product comprising a central core having opposite sides, at least two crossbanding layers each having a first and a second surface, said first surface of a layer being superimposed on and adhered to each of the respective sides of said core, a veneer superimposed on and adhered to each of the respective second surfaces of said crossbanding layers, said crossbanding layers being formed of randomly disposed, synthetic fibers formed into a sheet, said sheet being treated with a plastic material to stiffen the sheet and provide a permeability to within a range of about 1 to 40 c.f.m./ft.$^2$ at ½ inch $H_2O$ pressure differential, said plastic material leaving said sheet surfaces unglazed, and a bonding agent bonding said veneers to said crossbands and the latter to said core, said bonding agent penetrating said crossbanding layer surfaces.

References Cited

UNITED STATES PATENTS

| | | | |
|---|---|---|---|
| 1,448,180 | 3/1923 | Atwood. | |
| 1,921,164 | 8/1933 | Lewis | 161—60 |
| 2,429,235 | 10/1947 | Miskelly et al. | 161—56 |
| 3,323,977 | 6/1967 | Hood | 161—56 |
| 3,427,216 | 2/1969 | Quinn | 161—270 |

FOREIGN PATENTS

| | | |
|---|---|---|
| 626,852 | 7/1949 | Great Britain. |

ROBERT F. BURNETT, Primary Examiner

R. L. MAY, Assistant Examiner

U.S. Cl. X.R.

161—56, 151, 170, 270

UNITED STATES PATENT OFFICE
CERTIFICATE OF CORRECTION

Patent No. 3,522,138      Dated July 28, 1970

Inventor(s)   Charles Allen Lee

It is certified that error appears in the above-identified patent and that said Letters Patent are hereby corrected as shown below:

Column 5, line 4, change "millimeters" to --mils--.

Signed and sealed this 9th day of January 1973.

(SEAL)
Attest:

EDWARD M. FLETCHER, JR.             ROBERT GOTTSCHALK
Attesting Officer                     Commissioner of Patents